United States Patent
Egawa et al.

(10) Patent No.: US 7,551,661 B2
(45) Date of Patent: Jun. 23, 2009

(54) GAS LASER OSCILLATOR

(75) Inventors: Akra Egawa, Gotenba (JP); Eiji Kobayashi, Gotenba (JP); Takeshi Watanabe, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 69 days.

(21) Appl. No.: 11/755,013

(22) Filed: May 30, 2007

(65) Prior Publication Data

US 2008/0043799 A1 Feb. 21, 2008

(30) Foreign Application Priority Data

Jun. 22, 2006 (JP) ............................. 2006-172945

(51) Int. Cl.
*H01S 3/20* (2006.01)
(52) U.S. Cl. ............................. 372/58; 372/55; 372/59
(58) Field of Classification Search ............. 372/55–65
See application file for complete search history.

(56) References Cited

U.S. PATENT DOCUMENTS

| | | | |
|---|---|---|---|
| 5,586,134 A * | 12/1996 | Das et al. ................. | 372/38.03 |
| 5,642,374 A * | 6/1997 | Wakabayashi et al. ........ | 372/57 |
| 6,366,039 B1 | 4/2002 | Sekiguchi et al. | |

FOREIGN PATENT DOCUMENTS

| JP | 01128581 A | 5/1989 |
|---|---|---|
| JP | 03052281 A | 3/1991 |
| JP | 2001-044534 A | 2/2001 |
| WO | 2005104308 A1 | 11/2005 |

OTHER PUBLICATIONS

Hong-Sik Lee; Yoon-Taek Kim: "Instrumentation of an RF excited Fast Axial Flow Carbon Dioxide Laser and its Operation Characteristics"Transactions of the Korean Institute of Electrical Engineers-XP009089289.
EP Search Report of Application No. 07010181.1-2222 dated Sep. 21, 2007.

* cited by examiner

*Primary Examiner*—Minsun Harvey
*Assistant Examiner*—Xnning Niu
(74) *Attorney, Agent, or Firm*—Lowe, Hauptman, Ham & Berner, LLP (57) ABSTRACT

A gas laser oscillator (2) that excites a laser gas to generate laser light includes a circulation path (9) for the laser gas, a circulation means (14) for circulating the laser gas through the circulation path, a pressure detection means (16) for detecting the pressure of the laser gas in the circulation path, an electric power detection means (11) for detecting electric power to drive the circulation means, a storage means (35) for storing the relationship between the pressure of the laser gas and the electric power of the circulation means during the period of normal operation of the circulation means for each kind of the laser gas, and a laser gas determination means (31). The laser gas determination means determines the kind of the laser gas based on the pressure of the laser gas and the electric power of the circulation means detected during the period of normal operation of the circulation means, and the relationship between the pressure of the laser gas and the electric power of the circulation means stored in the storage means. Due to this, the laser gas is determined without generating a discharge voltage. If the laser gas cannot be determined, it may be possible to judge that the laser oscillator is anomalous.

6 Claims, 4 Drawing Sheets

GAS LASER OSCILLATOR

RELATED APPLICATIONS

The present application is based on, and claims priority from, Japanese Application Number 2006-172945, filed Jun. 22, 2006, the disclosure of which is hereby incorporated by reference herein in its entirety.

BACKGROUND OF THE INVENTION

1. Field of the Invention

The present invention relates to a gas laser oscillator that excites a gas to obtain laser output.

2. Description of the Related Art

A general gas laser oscillator excites a laser gas sealed in a discharge tube by discharge energy between discharge electrodes, and generates laser light having an oscillation wavelength corresponding to the amount of energy emitted when a molecule or atom of the gas in the excited state transits to a lower energy level.

In such a gas laser oscillator, an optimum composition of a laser gas is determined in advance. Then, the pressure of the laser gas in the gas laser oscillator is set to be optimum based on the laser gas having that composition.

When the composition of an optimum laser gas is different from the composition determined in advance and/or the pressure setting of the laser gas in the gas laser oscillator is different from the pressure setting determined in advance, it is not possible to obtain an optimum laser output.

Because of this, in Japanese Unexamined Patent Publication (Kokai) No. 2001-44534, for example, discharge voltage of a laser gas is measured and the composition of the laser gas is adjusted based on the measured discharge voltage. In other words, in Japanese Unexamined Patent Publication (Kokai) No. 2001-44534, the composition of the laser gas is determined from the discharge voltage and the composition of the laser gas is adjusted based on the result.

However, in Japanese Unexamined Patent Publication (Kokai) No. 2001-44534, it is necessary to generate discharge voltage in order to adjust the composition of the laser gas, and therefore, it is not possible to determine the composition of the laser gas before discharge. In addition, in Japanese Unexamined Patent Publication (Kokai) No. 2001-44534, it is necessary to cause a discharge to occur each time the composition of the laser gas is determined, and therefore, the laser power supply and/or the discharge tube may gradually deteriorate due to the discharge. Further, when the composition of the laser gas is different from the composition determined in advance, an anomalous discharge may occur and the laser power supply and/or the discharge tube may quickly deteriorate.

The present invention has been developed taking the above into consideration, and an object thereof is to provide a gas laser oscillator capable of determining a laser gas without generating a discharge voltage.

SUMMARY OF THE INVENTION

In order to attain the above-described object, according to a first aspect, there is provided a gas laser oscillator that excites a laser gas to generate laser light, comprising: a circulation path for the laser gas; a circulation means for circulating the laser gas through the circulation path; a pressure detection means for detecting the pressure of the laser gas in the circulation path; an electric power detection means for detecting electric power to drive the circulation means; a storage means for storing the relationship between the pressure of the laser gas and the electric power of the circulation means during a period of normal operation of the circulation means for each kind of laser gas; and a laser gas determination means for determining the kind of laser gas based on the pressure of the laser gas and the electric power of the circulation means detected by the pressure detection means and the electric power detection means, respectively, during the period of normal operation of the circulation means; and the relationship between the pressure of the laser gas and the electric power of the circulation means stored in the storage means.

In other words, in the first aspect, when the laser gas is determined, the kind of laser gas is determined based on the pressure and electric power of the circulation means, such as a turbo blower during the period of normal operation. That is, when the laser gas is determined, it is not necessary to generate discharge voltage. Due to this, when the laser gas is determined, a part of the laser oscillator, for example, the laser power supply and/or the discharge tube does not deteriorate, and further, it is possible to avoid a risk of an anomalous discharge when the laser gas is determined.

According to a second aspect, there is further provided in the first aspect an anomaly judgment means for judging that the gas laser oscillator is anomalous when the kind of laser gas cannot be determined by the laser gas determination means.

According to a third aspect, there is further provided in the first aspect an anomaly judgment means for judging that the gas laser oscillator is anomalous when the deviation between: the relationship between the pressure of the laser gas and the electric power of the circulation means detected by the pressure detection means and the electric power detection means, respectively, during the period of normal operation of the circulation means; and the relationship between the pressure of the laser gas and the electric power of the circulation means stored in the storage means is greater than a predetermined value.

In other words, in the second and third aspects, the fact that the gas laser oscillator is anomalous is notified to an operator, and by this, it is possible to avoid the use of the gas laser oscillator in an anomalous state.

According to a fourth aspect, in any one of the first to third aspects, the pressure of the laser gas and the electric power of the circulation means are simultaneously detected by the pressure detection means and the electric power detection means, respectively.

In other words, in the fourth aspect, it is possible to improve the accuracy of determining the laser gas.

According to a fifth aspect, there are provided in any one of the first to fourth aspects an actually measured slope value calculation means for calculating the amount of change in the detected electric power with respect to the amount of change in the detected pressure as an actually measured slope value when the pressure of the laser gas and the electric power of the circulation means are detected at least twice by the pressure detection means and the electric power detection means, respectively, and a theoretical slope value calculation means for calculating the amount of change in the electric power with respect to the amount of change in the detected pressure as a theoretical slope value for each kind of the laser gas using the relationship between the pressure of the laser gas and the electric power of the circulation means stored in the storage means, wherein it is possible for the laser gas determination means to determine the kind of the laser gas further based on the actually measured slope value calculated by the actually measured slope value calculation means and the theoretical slope value calculated by the theoretical slope value calculation means.

In other words, in the fifth aspect, the theoretical slope value relating to the specific two pressures designated by the operator are calculated, and therefore, it is possible to more accurately determine a laser gas.

According to a sixth aspect, there is provided in any one of the first to fourth aspects an actually measured slope value calculation means for calculating the amount of change in the detected electric power with respect to the amount of change in the detected pressure as an actually measured slope value when the pressure of the laser gas and the electric power of the circulation means are detected at least twice by the pressure detection means and the electric power detection means, respectively, wherein it is possible for the laser gas determination means to determine the kind of the laser gas further based on the actually measured slope value calculated by the actually measured slope value calculation means and the slope for each kind of laser gas in the relationship between the pressure of the laser gas and the electric power of the circulation means stored in the storage means.

In other words, in the sixth aspect, the slope in the relationship between the pressure of the laser gas and the electric power of the circulation means has already been determined, and therefore, by using the slope as an ideal slope value instead of a theoretical slope value, it is possible to more quickly determine a laser gas compared to the case where the theoretical value of slope is calculated each time.

These and other objects, features and advantages of the present invention will be more apparent in light of the detailed description of exemplary embodiments thereof as illustrated by the drawings.

DETAILED DESCRIPTION

The embodiments of the present invention are explained below with reference to the accompanied drawings. In the following drawings, the same members are assigned like reference numerals, and for easier understanding, the scale of these drawings has been adjusted appropriately.

Figure 1:
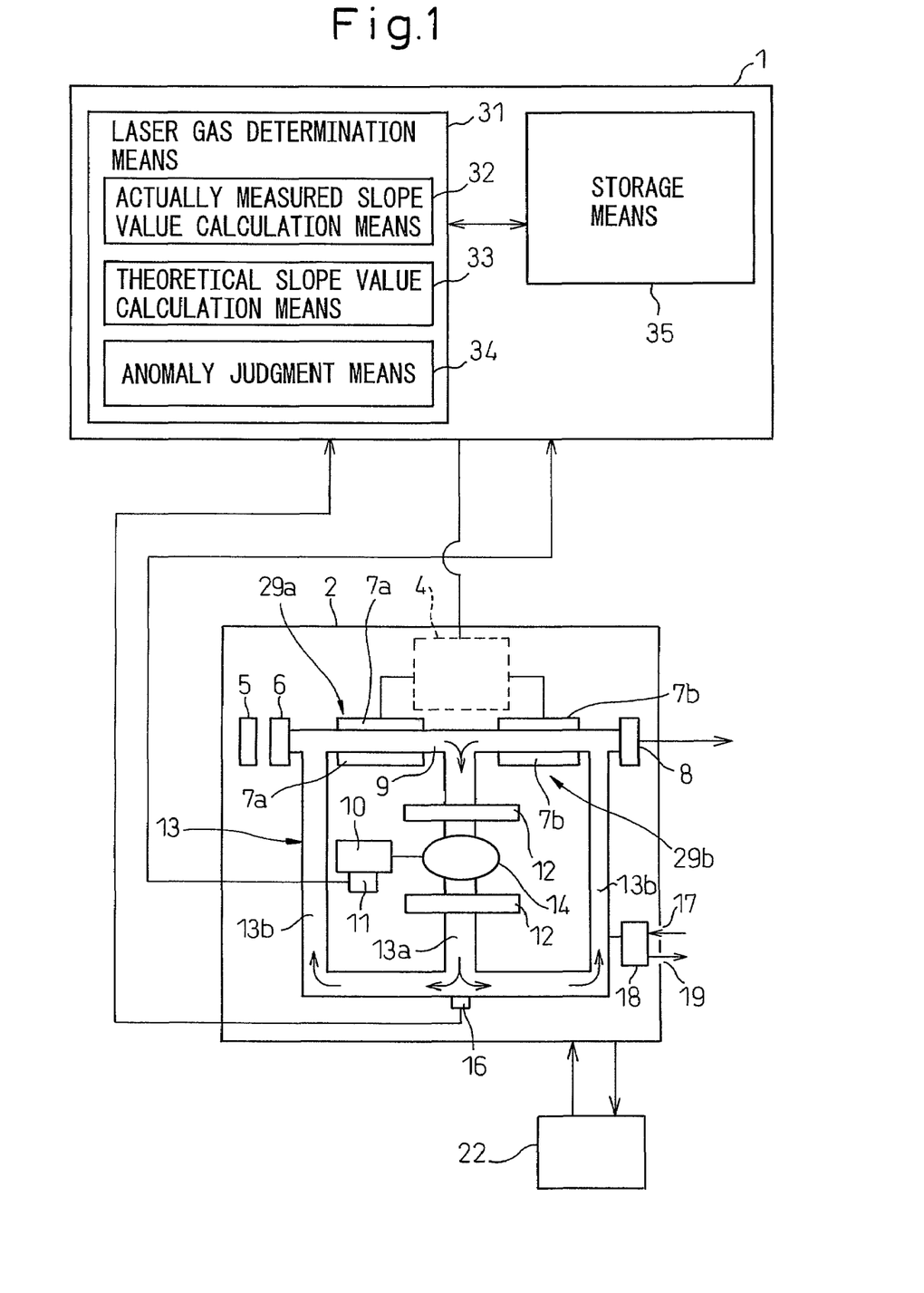
FIG. 1 is a schematic diagram of a gas laser oscillator according to the present invention.

FIG. 1 is a schematic diagram of a gas laser oscillator according to the present invention. A laser oscillator 2 in the present invention is a gas laser oscillator of a discharge excitation type with a comparatively high output, for example, a carbon dioxide gas laser with an output of 2 kW or greater. The laser oscillator 2 includes a circulation path 13. As shown schematically, the circulation path 13 comprises a discharge tube 9, a suction pipe path 13a that sucks a laser gas from substantially the central portion in the longitudinal direction of the discharge tube 9, and a return pipe path 13b for discharging the laser gas to the portions adjacent to both end portions of the discharge tube 9.

The circulation path 13 is connected to a laser gas pressure change means 18. The laser gas pressure change means 18 is capable of supplying and discharging the laser gas to and from the circulation path 13 through a laser gas supply inlet 17 and a laser gas discharge outlet 19 formed in the laser oscillator 2.

On one end of the discharge tube 9, a rear mirror 6 (internal resonator mirror) having partial transmittance is provided and on the other end of the discharge tube 9, an output mirror 8 having partial transmittance is provided. The output mirror 8 is made from ZnSe and the inner surface of the output mirror 8 is coated with a partial reflection coating and at the same time, the outer surface of the output mirror 8 is coated with a non-reflection coating. On the rear side of the rear mirror 6, a laser power sensor 5 is arranged.

In an optical resonance space between the rear mirror 6 and the output mirror 8, two discharge sections 29a, 29b are provided. Each of the discharge sections 29a, 29b includes a pair of discharge electrodes 7a, 7b arranged so as to sandwich the discharge tube 9, respectively. It is assumed that these discharge electrodes 7a, 7b have the same dimensions and are metalized or to which a metal member is attached.

As shown in FIG. 1, the discharge electrodes 7a, 7b are connected to a laser power supply 4, for example, a high frequency power supply of 2 MHz. The laser power supply 4 freely adjusts the electric power to be supplied to each of the discharge sections 29a, 29b independently.

In addition, in the suction pipe path 13a of the circulation path 13, a turbo blower 14 is arranged and on the upstream side and downstream side of the turbo blower, heat exchangers 12, 12' are arranged, respectively. An inverter 10 connected to the turbo blower 14 supplies electric power to drive the turbo blower 14 while controlling the number of revolutions of the turbo blower 14. Further, the laser oscillator 2 is connected to a cooling water circulation system 22 so that the laser gas in the circulation path 13, in particular, the laser gas in the discharge tube 9, etc., is cooled down appropriately.

As shown in FIG. 1, in the present invention, an electric power detection section 11 is arranged adjacent to the inverter 10. The electric power detection section 11 detects the electric power of the inverter 10 and inputs a monitor signal of the detected electric power to a control section 1, to be described later. In addition, as shown schematically, a pressure sensor 16 is provided in the circulation path 13. The pressure sensor 16 detects the pressure of the laser gas in the circulation path 13 and inputs a signal of the detected pressure to the control section 1 similarly.

The control section 1 is a digital computer and electrically connected to the laser oscillator 2. As shown schematically, the control section 1 mainly includes a laser gas determination means 31 and a storage means 35. The storage means 35 stores programs for driving the laser oscillator 2, operation programs, to be described later, for determining a laser gas etc., and various related data. In addition, the storage means 35 also serves to temporarily store the detected value of electric power and the detected value of pressure detected by the electric power detection section 11 and the pressure sensor 16, respectively.

Figure 2A:
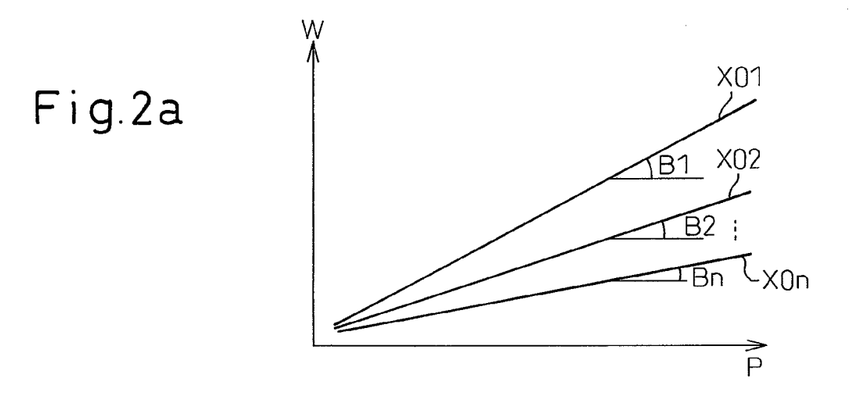
FIG. 2a is a diagram showing the relationship between the pressure of laser gas and the electric power of a turbo blower during a period of normal operation of the turbo blower.

FIG. 2a is a diagram showing the relationship between the pressure P of the laser gas and electric power W of the turbo blower during the period of normal operation of the turbo blower 14. In FIG. 2a, the horizontal axis represents the pressure P of the laser gas in the circulation path 13 and the vertical axis represents the electric power W required to drive the turbo blower 14.

In FIG. 2a, a plurality of substantially straight solid lines X01 to X0n are shown. These respective solid lines X01 to X0n show the relationship obtained in advance for laser gases having different compositions or composition ratios. In general, the density of laser gas differs depending on the composition and composition ratio of the laser gas. Consequently, the electric power of the turbo blower 14 required to circulate the laser gas varies depending on the kind of laser gas used. Because of this, the density of laser gas corresponding to the solid line X01 shown uppermost in FIG. 2a is greater than the densities of laser gas corresponding to other solid lines.

Figure 3A:
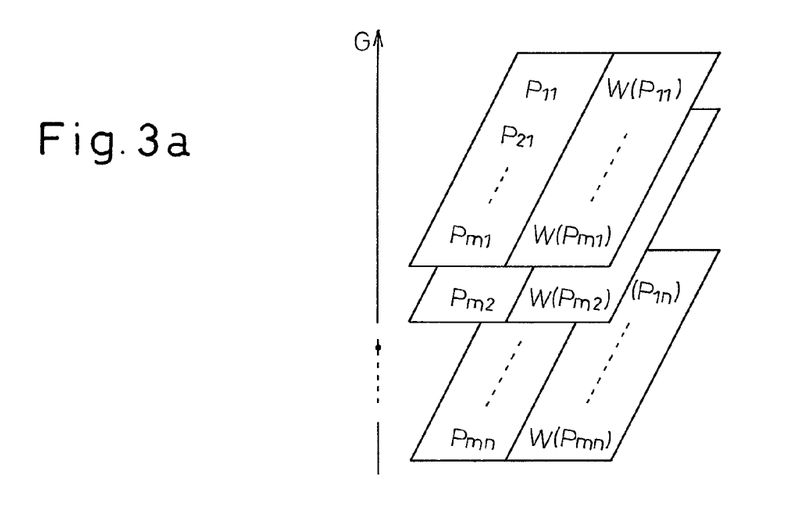
FIG. 3a is a diagram showing a map of pressure P and electric power W.

It is assumed that the relationship between the pressure P and the electric power W during the period of normal operation of the turbo blower 14 as shown in FIG. 2a are stored in advance in the storage means 35 of the control section 1. Specifically, such relationships are found in advance for each laser gas G by experimentation, etc. and stored in the form of a map, as shown in FIG. 3a.

In FIG. 2a, the slopes of the respective solid lines X01 to X0n are shown as ideal slope values B1 to Bn. Although not shown schematically, these ideal slope values B1 to Bn are also stored in the storage means 35 for each laser gas G.

Referring to FIG. 1 again, the laser gas determination means 31 includes an actually measured slope value calculation means 32 and a theoretical slope value calculation means 33 for calculating an actually measured slope value and a theoretical slope value, to be described later, respectively. Further, the laser gas determination means 31 also includes an anomaly judgment means 34 for judging whether or not an anomaly occurs in the laser oscillator 2, particularly, in the turbo blower 14.

During the period of operation of the laser oscillator 2 as shown in FIG. 1, the laser gas pressure change means 18 supplies a laser gas into the circulation path 13 through the laser gas supply inlet 17. Then, the laser gas circulates through the circulation path 13 by means of the turbo blower 14 provided in the suction pipe path 13a. As shown by the arrow in FIG. 1, the laser gas sent out from the turbo blower 14 passes through the heat exchanger 12' in order to remove compression heat and is supplied to each of the discharge sections 29a, 29b through the return pipe path 13b.

When a predetermined voltage, for example, an alternating voltage of hundreds kHz to tens MHz, is applied to the discharge sections 29a, 29b by the discharge electrodes 7a, 7b, the laser gas is excited by the discharge operation and due to this, laser beams are generated. According to already known principles, the laser beam is amplified in an optical resonance space and the laser beam is emitted through the output mirror 8. The laser beam emitted from the laser oscillator 2 is supplied to a laser machine (not shown) and used to machine a workpiece (not shown) in the laser machine.

Laser gas temperature of which has risen due to the discharge operation is cooled down by the heat exchanger 12 and returns to the turbo blower 14 again. At this time, it is assumed that the cooling water circulation system 22 operates so that the laser gas in the discharge tube 9 is cooled down appropriately.

Figure 4:
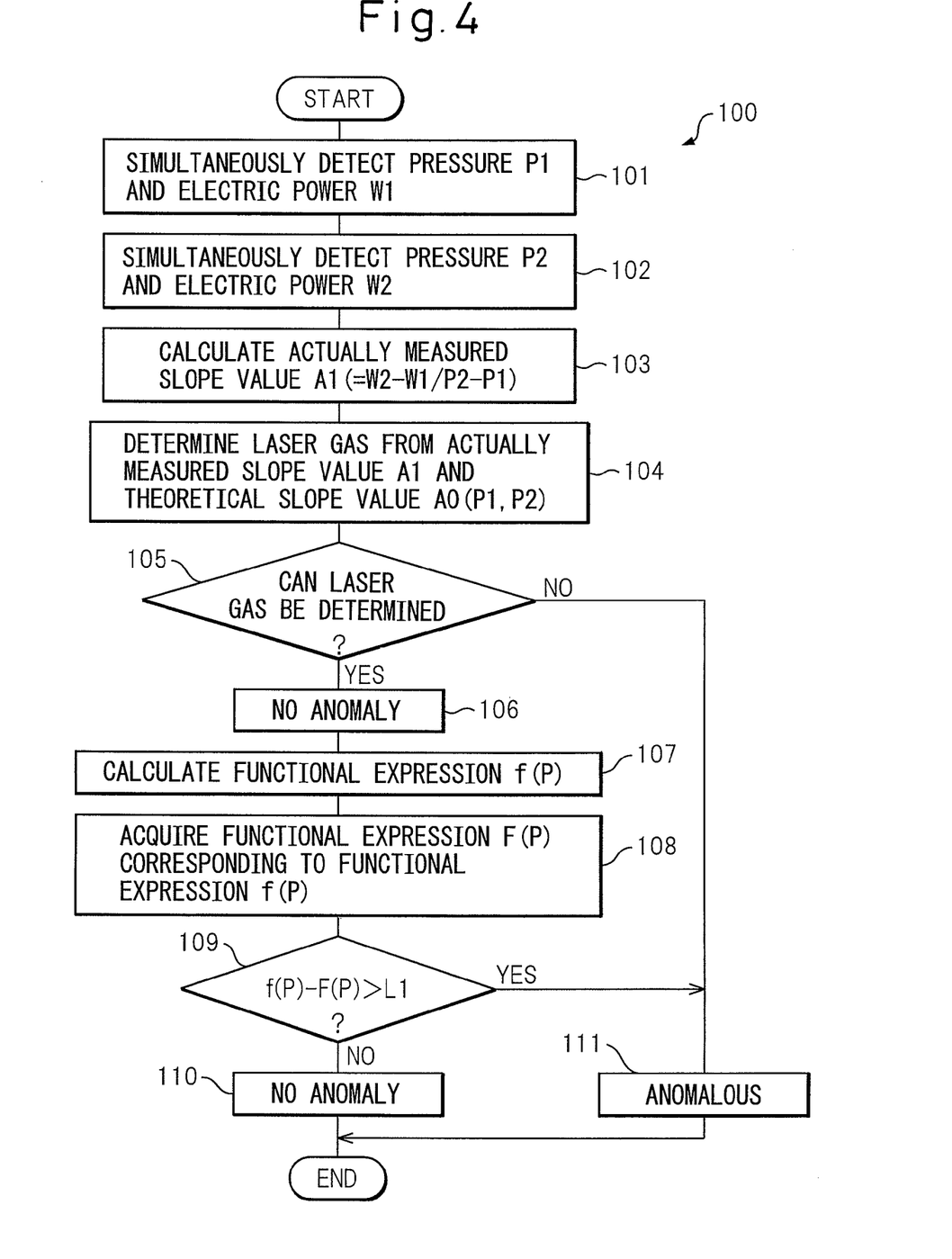
FIG. 4 is a flow chart showing operation programs for determining a laser gas and making an anomaly judgment in a laser oscillator according to the present invention.

FIG. 4 is a flow chart showing operation programs for determining the laser gas in the laser oscillator 2 and making an anomaly judgment 2 according to the present invention. It is assumed that the operation program 100 is executed by the laser gas determination means 31 of the control section 1 during the period of operation of the laser oscillator 2. The anomaly judgment of the laser oscillator 2 is explained below with reference to FIG. 4.

In step 101 shown in FIG. 4, pressure P1 of the laser gas in the circulation path 13 is detected with the pressure sensor 16 during the period of normal operation of the turbo blower 14. At the same time, electric power W1 supplied to the turbo blower 14 is detected by the electric power detection section 11. Next, in step 102, pressure P2 of the laser gas during the period of normal operation and electric power W2 supplied to the turbo blower 14 during the period of normal operation at a different timing from that in step 101 are detected.

Figure 2B:
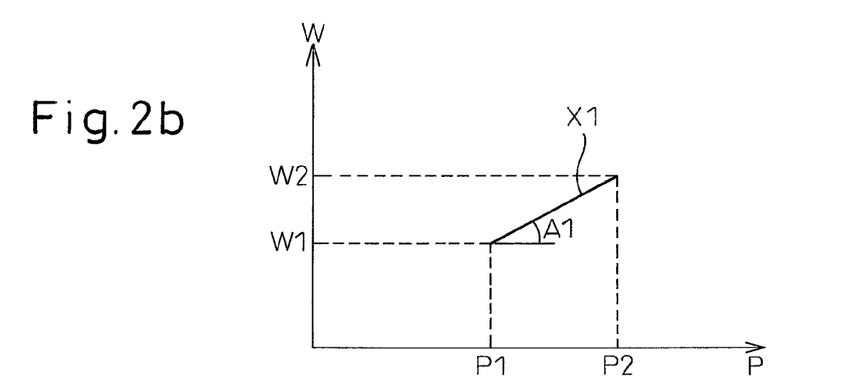
FIG. 2b is a diagram similar to FIG. 2a explaining an actually measured slope value.

Next, in step 103, based on the detected pressures P1, P2 and electric power W1, W2, the actually measured slope value calculation means 32 calculates an actually measured slope value A1. FIG. 2b is a diagram similar to FIG. 2a explaining the actually measured slope value. As shown in FIG. 2b, the detected pressures P1, P2 and electric power W1, W2 are plotted on a pressure-electric power plane and thus a segment X1 is constructed. Then, the actually measured slope value calculation means 32 calculates the slope of the segment X1 as the actually measured slope value $A1(=(W2-W1)/(P2-P1))$.

The calculated actually measured slope value A1 is, in step 104, compared with a theoretical slope value A0 calculated by the theoretical slope value calculation means 33. The theoretical slope value calculation means 33 first determines the electric power W (P1), W (P2) corresponding to the above-described pressure P1 and pressure P2 for each laser gas G using the map shown in FIG. 3a. Then, the theoretical slope value calculation means 33 calculates the theoretical slope value $A0 (=(W(P2)-W(P1))/(P2-P1))$ for each laser gas G.

After that, each of the theoretical slope values A0 calculated for each laser gas G is compared with the actually measured slope value A1 and whether or not there exists any theoretical slope value A0 corresponding to the actually measured slope value A1 is judged. Then, if there exists any theoretical slope value A0 corresponding to the actually measured slope value A1, it is determined that the laser gas G corresponding to the theoretical slope value A0 is the laser gas relating to the actually measured slope value A1, that is, the laser gas currently used in the circulation path 13.

Thus, in the gas laser oscillator of the present invention, in order to determine a laser gas, it is only required to detect the pressure P and electric power W during the period of normal operation of the turbo blower 14. In other words, when determining a laser gas, it is not necessary to generate discharge voltage. Because of this, in the present invention, the laser power supply 4 and/or the discharge tube 9 does not deteriorate due to the discharge operation when determining a laser gas, and it is also possible to avoid an anomalous discharge when determining a laser gas.

Figure 3B:
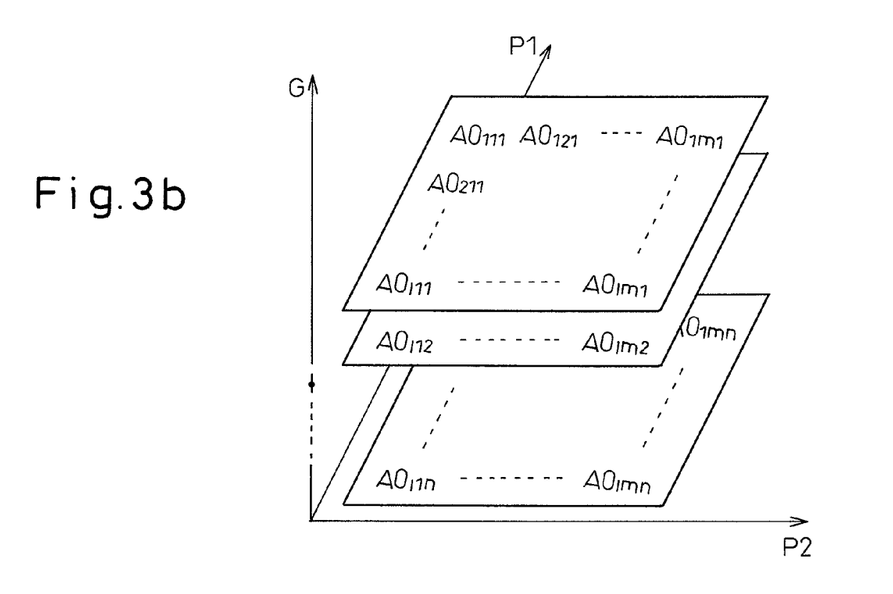
FIG. 3b is a diagram showing a map of theoretical slope value A0.

In the other embodiments, the theoretical slope values A0 are stored in the storage means 35 in the form of a map as a function of two arbitrary pressures P1, P2 as shown in FIG. 3b. Thus, it also may be possible to find the theoretical slope value A0 without using a calculating expression. In this case, it will be appreciated that the theoretical slope value A0 can be found quickly.

After that, in step 105, whether or not the laser gas could be determined is determined. Then, when the laser gas G could not be determined, that is, there existed no theoretical slope value A0 corresponding to the actually measured slope value A1, the procedure proceeds to step 111, where the anomaly judgment means 34 judges that the laser oscillator 2 is anomalous and terminates the procedure.

On the other hand, when the laser gas could be determined, it is judged that there is no anomaly (in step 106) and then the procedure proceeds to step 107. In step 107, an expression f (P) representative of the segment X1 shown in FIG. 2b is calculated. When calculating the expression f (P), the pressures P1, P2 and electric power W1, W2 detected in steps 101, 102 are used. However, it may also be possible to detect more pressures P and electric power W to utilize for calculating the expression f (P) in order to improve the precision of the calculated expression f (P).

Next, in step 108, an expression F (P) corresponding to the expression f (P) is acquired. This is sufficient to formulate the expression F (P) using the relationship (refer to FIG. 3a) between the pressure P and the electric power W corresponding to the laser gas G determined in step 104. Incidentally, it should be noted that the formulated expression F (P) corresponds to one of the solid lines X01 to X0n shown in FIG. 2a.

Next, in step 109, the deviation (f (P)–F (P)) obtained by subtracting the expression F (P) from the expression f (P), is compared with a predetermined threshold value L1. The predetermined threshold value L1 is a value found in advance for each kind of laser gas by experiments etc. and stored in the storage means 35.

Figure 2C:
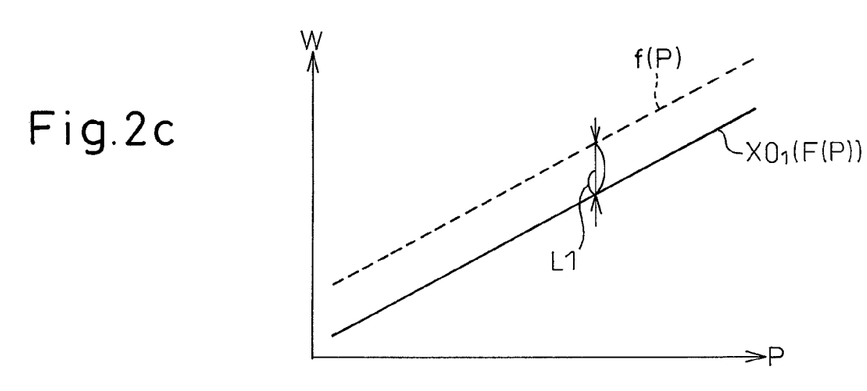
FIG. 2c is a diagram similar to FIG. 2a showing the relationship between the pressure of a laser gas and the electric power of a turbo blower.

As can be seen by referring to FIG. 2(c), when the deviation (f (P)–F (P)) is greater than the predetermined threshold value L1, it means that the expression f (P) is considerably different from the expression F (P). The causes of the difference of the expression f (P) from the expression F (P) include, for example, the fact that a bearing (not shown) used in the turbo blower 14 is broken and the torque increases and the fact that electric power increases because of leak etc. In such a case, in step 111, the anomaly judgment means 34 judges that the laser oscillator 2 is anomalous.

On the other hand, when the deviation (f (P)–F (P)) is equal to or less than the predetermined threshold value L1, that is, the expression f (P) is substantially equal to the expression F (P) or slightly greater than the expression F (P), it can be regarded that the expression f (P) is different from the expression F (P) within a measurement error. Consequently, in this case, in step 110, the anomaly judgment means 34 judges that there is no anomaly in the laser oscillator 2 and terminates the procedure.

It will be appreciated that since the anomaly judgment means 34 as described above is provided in the present invention, it is possible to notify an operator that the laser oscillator is anomalous and avoid the use of the gas laser oscillator when it is in an anomalous state.

In addition, in the other embodiments of the present invention, it also may be possible to use the respective ideal slope values B1 to Bn (refer to FIG. 2a) for the respective solid lines X01 to X0n. In this case, it is not necessary to calculate the theoretical slope value A0 corresponding to the specific pressures P1, P2 in step 104. Consequently, it is possible to determine a laser gas more quickly than compared with a case where the theoretical slope value is calculated each time.

As a matter of course, it also may be possible to calculate the actually measured slope value A1 after detecting the pressure P and the electric power W three times or more. In addition, it may also be possible to calculate the flow rate of the laser gas in the circulation path 13 using the pressure P of the laser gas and determine the kind of the laser gas from the relationship between the flow rate of the laser gas found in advance and the electric power W. It is apparent that such a case is also included in the scope of the present invention.

Although the invention has been shown and described with exemplary embodiments thereof, it should be understood by those skilled in the art that the foregoing and various other changes, omissions and additions may be made therein and thereto without departing from the scope of the invention.

The invention claimed is:

1. A gas laser oscillator that excites a laser gas to generate laser light, comprising:
    a circulation path for the laser gas;
    a circulation means for circulating the laser gas through the circulation path;
    a pressure detection means for detecting the pressure of the laser gas in the circulation path;
    an electric power detection means for detecting electric power to drive the circulation means;
    a storage means for storing the relationship between the pressure of the laser gas and the electric power of the circulation means during the period of normal operation of the circulation means for each kind of the laser gas; and
    a laser gas determination means for determining the kind of the laser gas based on the pressure of the laser gas and the electric power of the circulation means detected respectively by the pressure detection means and the electric power detection means during the period of normal operation of the circulation means, and the relationship between the pressure of the laser gas and the electric power of the circulation means stored in the storage means.

2. The gas laser oscillator as set forth in claim 1, further comprising an anomaly judgment means for judging that the gas laser oscillator is anomalous when the kind of the laser gas cannot be determined by the laser gas determination means.

3. The gas laser oscillator as set forth in claim 1, further comprising an anomaly judgment means for judging that the gas laser oscillator is anomalous when the deviation between: the relationship between the pressure of the laser gas and the electric power of the circulation means detected respectively by the pressure detection means and the electric power detection means during the period of normal operation of the circulation means; and the relationship between the pressure of the laser gas and the electric power of the circulation means stored in the storage means is equal to or greater than a predetermined value.

4. The gas laser oscillator as set forth in claim 1, wherein the pressure of the laser gas and the electric power of the circulation means are simultaneously detected by the pressure detection means and the electric power detection means, respectively.

5. The gas laser oscillator as set forth in claim 1, further comprising:
    an actually measured slope value calculation means for calculating the amount of change in the detected electric power with respect to the amount of change in the detected pressure as an actually measured slope value when the pressure of the laser gas and the electric power of the circulation means are detected at least twice by the pressure detection means and the electric power detection means, respectively; and
    a theoretical slope value calculation means for calculating the amount of change in the electric power with respect to the amount of change in the detected pressure as a theoretical slope value for each kind of the laser gas using the relationship between the pressure of the laser gas and the electric power of the circulation means stored in the storage means, wherein the laser gas determination means determines the kind of the laser gas further based on the actually measured slope value calculated by the actually measured slope value calculation means and the theoretical slope value calculated by the theoretical slope value calculation means.

6. The gas laser oscillator as set forth in claim 1, further comprising an actually measured slope value calculation means for calculating the amount of change in the detected electric power with respect to the amount of change in the detected pressure as an actually measured slope value when the presser of the laser gas and the electric power of the circulation means are detected at least twice by the pressure detection means and the electric power detection means, respectively, wherein the laser gas determination means determines the kind of the laser gas further based on the actually measured slope value calculated by the actually measured slope value calculation means and the slope for each kind of the laser gas in the relationship between the pressure of the laser gas and the electric power of the circulation means stored in the storage means.

* * * * *

UNITED STATES PATENT AND TRADEMARK OFFICE
CERTIFICATE OF CORRECTION

| | |
|---|---|
| PATENT NO. | : 7,551,661 B2 |
| APPLICATION NO. | : 11/755013 |
| DATED | : June 23, 2009 |
| INVENTOR(S) | : Akira Egawa et al. |

Page 1 of 1

It is certified that error appears in the above-identified patent and that said Letters Patent is hereby corrected as shown below:

On the title page, please correct the first inventor's name to read:

(75) Inventors: Akira Egawa, Gotenba (JP); Eiji Kobayashi, Gotenba (JP); Takeshi Watanabe, Fujiyoshida (JP)

Signed and Sealed this

Nineteenth Day of January, 2010

David J. Kappos
*Director of the United States Patent and Trademark Office*